J. FOWLER, Jr.
Steam-Plow.
No. {1,021, 32,025.}
Patented Apr. 9, 1861
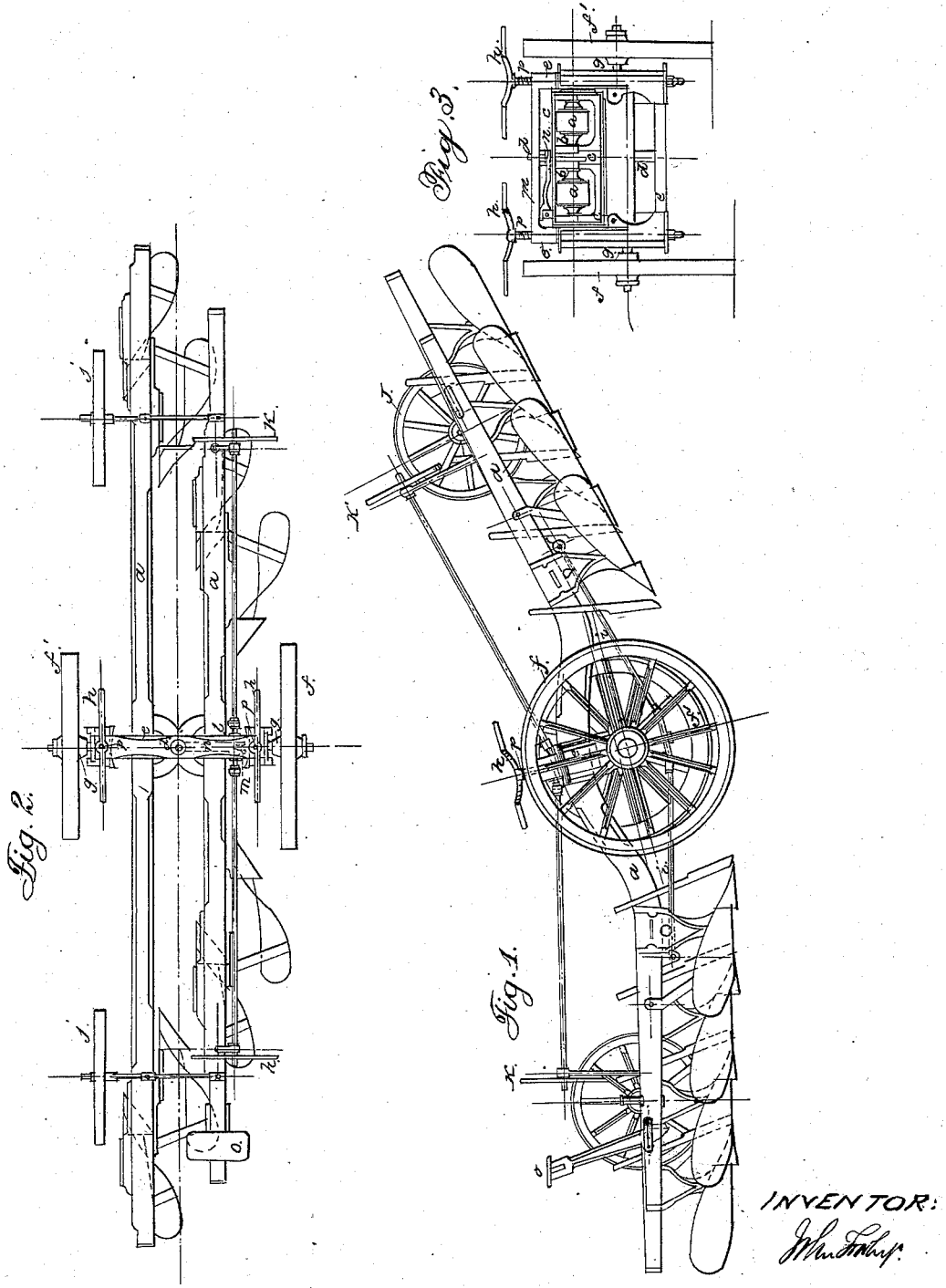
WITNESSES:
INVENTOR:

UNITED STATES PATENT OFFICE.

JOHN FOWLER, JR., OF LEEDS, ENGLAND, ASSIGNOR TO WM. PENN TATHAM, OF PHILADELPHIA, PENNSYLVANIA.

IMPROVEMENT IN MACHINERY FOR PLOWING AND TILLING LAND.

Specification forming part of Letters Patent No. 32,025, dated April 9, 1861.

*To all whom it may concern:*

Be it known that I, JOHN FOWLER, Jr., late of Havering, in the county of Essex, but now of Leeds, in the county of York, England, engineer, have invented certain new and useful Improvements in Machinery or Apparatus for Plowing and Tilling Land; and I do hereby declare that the following is a full, clear, and exact description thereof, reference being had to the accompanying drawings, making part of this specification, in which—

Figure 1 is a side view; Fig. 2, a plan, and Fig. 3 an end view.

The same letters indicate like parts in all the figures.

My said invention relates to an improvement on a former invention made by myself jointly with David Greig, of Barkingside, in the county of Essex, England, and described in Letters Patent granted to us in England, and bearing date the 28th day of February, 1856, and sealed on the 17th day of June, 1856, and also in an application for Letters Patent of the United States therefor.

In the said former invention two gangs of plows or other tilling instruments are attached to and carried by a tilting frame which vibrates on an axis in a frame sustained on a pair of supporting and gaging wheels placed centrally between the two gangs, so that by the tilting motion of the said frame when one gang is brought down into action the other is lifted up clear of the surface of the land; but in this said former invention the central wheels performed only the functions, first, of supporting the frame with the gangs of tilling instruments, and, second, that of gaging the depth to which the said instruments should enter below the surface of the land, the said wheels being adjustable up and down relatively to the frame carrying the tilling instruments. And my present invention consists in combining therewith a steering apparatus by a mechanism which enables the operator while riding on the apparatus to change at will the direction of the motion in plowing or tilling.

In the accompanying drawings, $a$ represents the tilting frame, to which are secured the two gangs of plows or other tilling instruments, there being one gang on each side of the axis of vibration. One end of this frame is at such an angle with the other that when one gang of tilling instruments is in action the other gang, as before suggested, is elevated to clear the surface. This frame $a$ vibrates at its center on an axis, $b$, mounted in a frame, $c$, and the said frame $c$ is mounted on an axle, $d$, to which it is journaled, that it may turn thereon in a horizontal, or nearly horizontal, plane, and the ends of the said axle are attached to an outer frame, $e$, which is mounted on two wheels, $f f'$, the hubs of which are fitted to turn on journal-arms $g g$, that project from the sides of the said frame $e$, the said arms being adapted to slide up and down in grooves made in the sides of the said frame $e$, and they are adjustable up and down by vertical screw-rods $p p$, provided with handles $h h$, the said rods being tapped in the arms $g g$, where they slide in the frame $e$.

There is an arm, $n$, which projects from the axle $d$, and which is fitted to embrace the threads of a screw-shaft, $l$, which has its bearings attached to the inner frame, $c$, so that by the turning of this screw-shaft and its action on the arm $n$ the frame $e$, with which the gaging and sustaining wheels are connected, is placed at an angle with the frame $a$, and in this way the direction of motion of the entire apparatus can be varied or steered to plow or till in the proper direction at the will of the operator.

To each end of the screw-shaft $l$ is connected by a universal joint, as represented, the shaft of a hand or steering wheel, $k$, so that the attendant on a seat, $o$, which can be placed at either end of the frame $a$, can operate the steering apparatus to give the required direction to the apparatus as it is pulled by the engine.

There are draft bars or rods $i i$ attached to the under part of the frame $a$ and passing under the frame $e$, and to these rods the draft ropes or chains are to be attached.

Near each end of the frame $a$ there is a gaging and sustaining wheel, $j$, as represented.

The central wheels, $f f'$, are of different diameter, the one, $f$, to run in the furrow when plowing, and the other, $f'$, to run on the surface of the unplowed land; but for other kinds of tilling both wheels may be of equal diameter.

Having thus pointed out the mode of application of my said invention which I have reduced to practice with success, I do not wish to be understood as limiting my claim of invention to such mode of application, as other and equivalent modes may be substituted without deviating from the principle of my said invention.

What I claim as my invention, and desire to secure by Letters Patent, is—

Combining with the central pair of sustaining-wheels, and with the frame which carries the two gangs of plows or other tilling instruments, a steering apparatus, substantially as herein described.

JOHN FOWLER, JR.

Witnesses:
  ROBT. WM. EDDISON,
  ALEXR. THOMSON.